(12) United States Patent
Howard

(10) Patent No.: US 7,174,077 B1
(45) Date of Patent: Feb. 6, 2007

(54) FIBER COUPLED LASER DIODES WITH EVEN ILLUMINATION PATTERN

(75) Inventor: Richard T. Howard, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/631,220

(22) Filed: Jul. 30, 2003

(51) Int. Cl.
G02B 6/02 (2006.01)
G02B 6/12 (2006.01)
G02B 6/34 (2006.01)
G02B 6/04 (2006.01)
F21V 7/04 (2006.01)

(52) U.S. Cl. .................. 385/123; 385/124; 385/15; 385/31; 385/37; 385/38; 362/551; 362/554

(58) Field of Classification Search ........... 385/37, 385/119, 123–128; 362/551, 558
See application file for complete search history.

(56) References Cited

U.S. PATENT DOCUMENTS

| 4,406,732 | A | * | 9/1983 | Kayoun ..................... 216/85 |
| 4,733,937 | A | | 3/1988 | Lia et al. |
| 4,846,552 | A | * | 7/1989 | Veldkamp et al. ........... 359/572 |
| 5,113,286 | A | | 5/1992 | Morrison |
| 5,148,317 | A | | 9/1992 | Foresi |
| 5,570,442 | A | * | 10/1996 | Arii et al. .................... 385/46 |
| 5,581,683 | A | | 12/1996 | Bertignoll et al. |
| 5,718,496 | A | * | 2/1998 | Feldman et al. ............ 353/42 |
| 5,719,973 | A | * | 2/1998 | Monroe et al. .............. 385/34 |
| 5,751,871 | A | * | 5/1998 | Krivoshlykov et al. ....... 385/33 |
| 5,859,945 | A | | 1/1999 | Kato et al. |
| 5,891,747 | A | * | 4/1999 | Farah ........................ 438/31 |
| 5,973,730 | A | * | 10/1999 | Tranchita et al. ........... 348/143 |
| 6,025,938 | A | | 2/2000 | Kathman et al. |
| 6,072,631 | A | | 6/2000 | Guenther et al. |
| 6,157,756 | A | | 12/2000 | Ishiwata |
| 6,313,948 | B1 | | 11/2001 | Hanna |
| 6,394,665 | B1 | | 5/2002 | Hayashi |

FOREIGN PATENT DOCUMENTS

FR WO 02/33463 * 4/2002

OTHER PUBLICATIONS

Richard T. Howard, Thomas Bryan, Michael Book and Richard W. Dabney, The Video Guidance Sensor—A Flight Proven Technology, Advances in the Astronautical Sciences, Guidance and Control, (Jan. 31, 1999).*

Richard T. Howard, Thomas Bryan, Michael Book and Richard W. Dabney, "The Video Guidance Sensor—A Flight Proven Technology," Advances in the Astronautical Sciences, Guidance and Control, (Jan. 31, 1999).

* cited by examiner

*Primary Examiner*—Frank G. Font
*Assistant Examiner*—Ryan Lepisto
(74) *Attorney, Agent, or Firm*—James J. McGroary; Anthony P. Venturino

(57) ABSTRACT

An optical fiber for evenly illuminating a target. The optical fiber is coupled to a laser emitting diode and receives laser light. The laser light travels through the fiber optic and exits at an exit end. The exit end has a diffractive optical pattern formed thereon via etching, molding or cutting, to reduce the Gaussian profile present in conventional fiber optic cables. The reduction of the Gaussian provides an even illumination from the fiber optic cable.

2 Claims, 7 Drawing Sheets

NEGATIVE LENS

POSITIVE LENS

FIBER COUPLED LASER DIODES WITH EVEN ILLUMINATION PATTERN

STATEMENT REGARDING FEDERALY SPONSORED RESEARCH AND DEVELOPMENT

The invention described herein was made by an employee of the United States Government and may be manufactured and used by or for the Government for Government purposes without the payment of any royalties thereon or therefore.

FIELD OF INVENTION

This invention relates to the transfer and projection of laser light emitting from a laser diode and through a fiber optic and projected upon a target, with a diffractive optical pattern etched onto the end of the fiber optic to prevent a Gaussian illumination pattern.

BACKGROUND OF INVENTION

When a laser emits a laser beam, the beam inherently has a Gaussian intensity profile wherein the center portion of the beam is brighter than the outer edges of the beam. Sometimes the power intensity difference between the middle and the edges of the beam can be greater than ten percent. Further, when a laser beam emitted from a laser diode is passed through a fiber optic to direct the projection of the beam, the beam begins to spread throughout the fiber optic and spreads when the beam exits the fiber optic. When these two phenomena are observed in a single system, a laser beam emitting from a fiber optic coupled to a laser diode, the beam spreads out at an angle and has a Gaussian profile. FIGS. 1 and 2 illustrate this phenomena in detail, where a fiber optic 1 has a pair of light beams 10 and 11 exiting therefrom. The beams 10 and 11 bounce against the walls of fiber optic 1 until they exit an end potion. They will exit at a certain angle $\alpha$ from optic fiber 1. Angle $\alpha$ can vary from optic to optic depending on the width and straightness of the fiber and the propagation of the beam within the fiber.

As the light beams exit from fiber optic 1, they will generally have a greater concentration at the center of the projection path than at the edges. Thus, when the light beams are directed at a target, the illuminated portion will be brighter in the center than at the edges of the portion. This is the Gaussian profile. FIG. 2 illustrates this phenomenon graphically. The graph represents the light distribution along line A—A in FIG. 1. In the graph, the width distance of the light beams represents the horizontal axis and the power intensity of the beam is represented by the vertical axis. Note that the closer to the center of the light beam, the greater the concentration of individual light rays and hence more power. This will appear as a bright center tapering off to a dimmer outer portion of the light projection.

Prior art devices and apparatus have been devised to reduce these effects. For example, U.S. Pat. No. 5,148,317, incorporated by reference in its entirety, places a lens in the path of a laser beam. When the spreading laser beam enters the lens, the curvature of the lens collimates the light waves so they all travel through the lens in a parallel fashion. At the projection end of the lens, a diffractive optical pattern redirects the light waves to create an even illumination pattern on the projection target.

Another device places a homogenizer plate between the laser light source and a target plane, which is described in U.S. Pat. No. 6,025,938, incorporated by reference in its entirety. The homogenizer plate has a hologram pattern consisting of a series of diffractive fringes which direct the laser source to different portions of the target plane creating an even illumination and power intensity at the target plane.

Problems with these systems are that they require multiple pieces of equipment. In particular situations, such as space travel, where space is a large concern, such additional equipment can take up this space, and thus raise costs of a mission. Furthermore, it also performs unnecessary tasks by collimating the light throughout the lens, rendering the system greatly inefficient.

SUMMARY OF THE INVENTION

It is thus an object of the present invention to overcome the above identified problems with the prior art devices. It is a further object to provide a space-efficient and cost-effective system that requires no additional components in the laser diode/fiber optic system, reducing size, weight and power issues.

These and other objects are carried out with a fiber optic having an input end and an output end, wherein the output end has a diffractive optical pattern integral with the output end. The input end receives the laser light from a laser beam source, such as a laser diode. The laser light travels through the fiber optic and exits the fiber optic through the output end. The diffractive pattern redirects the light exiting the fiber optic, which usually has a Gaussian shape, into an even illumination pattern.

In a preferred embodiment of the invention, the fiber optic having the diffractive optical pattern is incorporated into a Video Guidance Sensor (VGS). The VGS is a sensor developed to allow an automated vehicle to dock with another spacecraft equipped with a passive target. The VGS can have as many as four laser diodes coupled with fiber optics, so that the output of the fiber optics can be placed around a video camera lens. The fiber optics project light on a target, the image of which is reflected back into the camera. The diffractive optical pattern on the end of the fiber optic provides an even illumination pattern across the target. Preferably, the diffractive optical pattern is incorporated on the end of each fiber optic cable coupled to each of the four laser diodes.

The diffractive optical pattern is preferably etched onto the output end of the fiber optic, and can be any of a binary, four-level, eight-level or other pattern sufficient to evenly illuminate a target. An example of an etching process is disclosed in U.S. Pat. No. 4,846,552, which is incorporated herein by reference in its entirety. Typical diffractive optical patterns for this purpose generally have a series of circular patterns of varying depths designed to transform the Gaussian shape of the light path and spread the light over the entire target surface.

In another preferred embodiment, a plurality of diffractive optical patterns are placed as a grid across the surface of the output end of the fiber optic. Such has the effect of further evenly illuminating a target surface.

BRIEF DESCRIPTION OF THE DRAWINGS

The invention will be described in detail in reference to several drawings, in which.

DETAILED DESCRIPTION OF THE INVENTION

Figure 1:
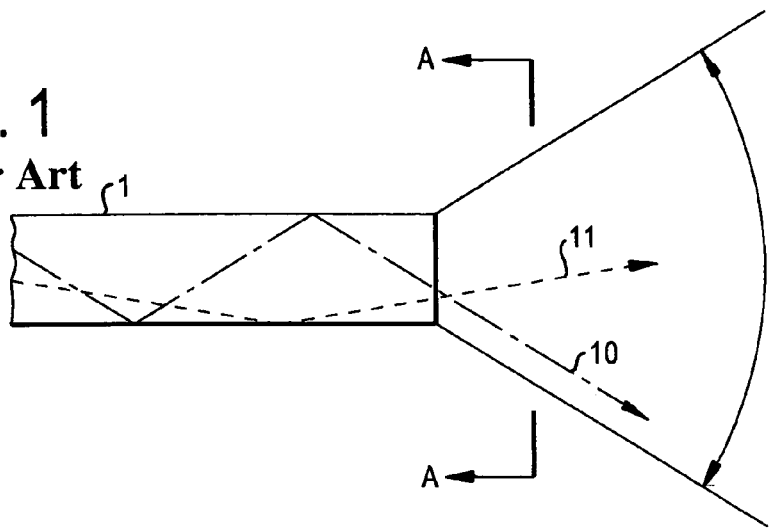
FIG. 1 illustrates a projection path for a typical fiber optic cable.
Figure 2:
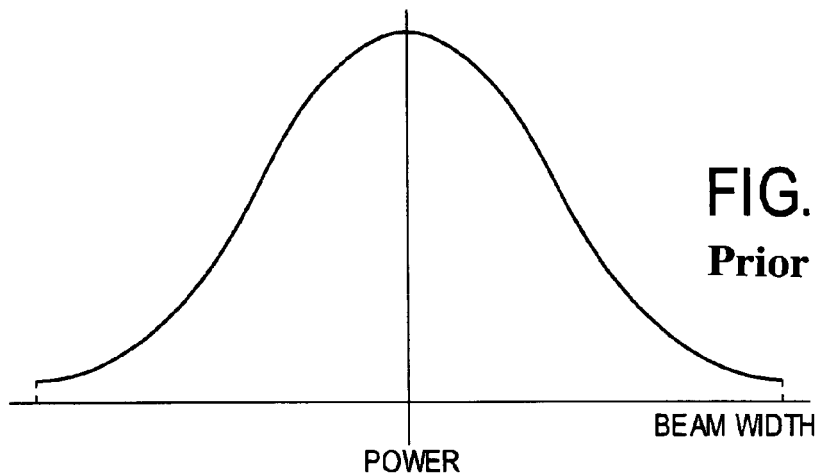
FIG. 2 illustrates a profile of the power dispersion along line A—A of FIG. 1.
Figure 3A:
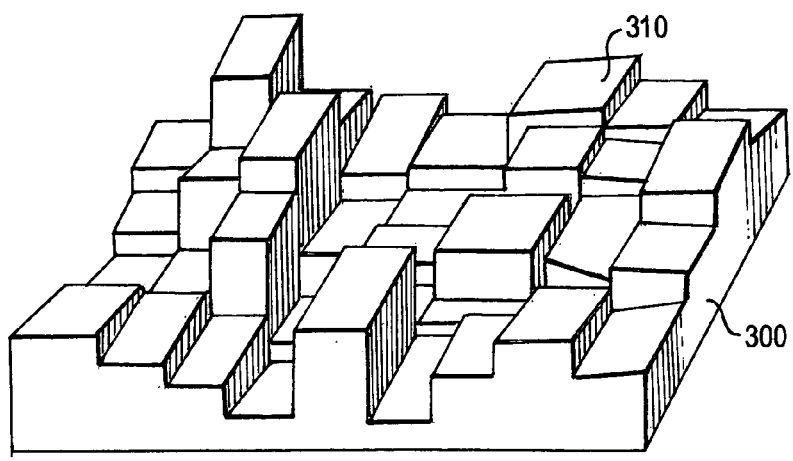
FIG. 3A shows a perspective view of a typical diffractive optic.
Figure 3B:
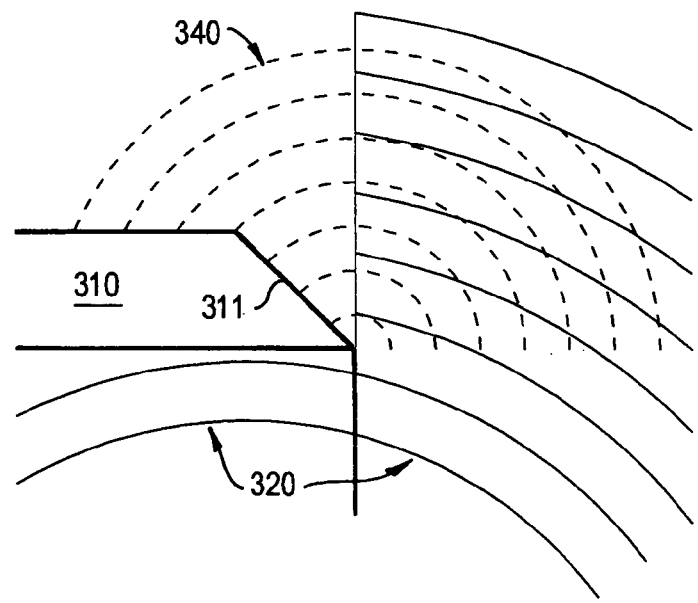
FIG. 3B illustrates a wavefront diffracted by a facet of the diffractive optic shown in FIG. 3A.

The preferred embodiment of this invention involves a diffractive optic. Various diffractive optics are known. As shown in FIG. 3A, a general diffractive pattern is shown in a diffractive optic 300. The material can be plastic or glass and has a plurality of facets 310 of different heights and angles. FIG. 3B illustrates how a wavefront 320 is affected after passing by and through a facet 310. As wavefront 320 passes by the edge 311 of facet 310, secondary weaker wavefronts 340 are generated, apparently originating at the edge. These secondary wavefronts 340 interfere with the primary wavefront to create a diffracted wavefront. The facets 310 can have calculated orientations to direct the light beam in a certain direction and this combined with the interference with the secondary wavefronts allow for controlled propagation of light beams from each facet. Thus, the projection path of the light beams can be altered to create any desired light pattern, such as a cross, a square, etc. The light beams can also be altered via a plurality of facets to cover the surface area of a target to create an even illumination pattern.

Figure 4A:
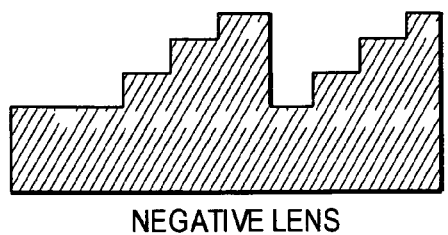
FIG. 4A shows a cross sectional view of a negative diffractive optical lens.
Figure 4B:
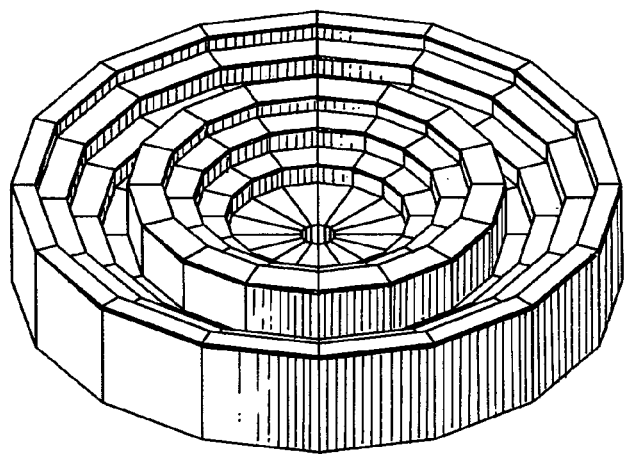
FIG. 4B shows a perspective view of the negative diffractive optical lens.
Figure 5A:
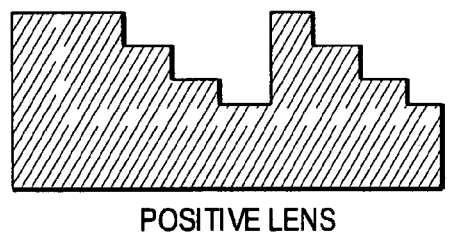
FIG. 5A shows a cross sectional view of a positive diffractive optical lens.
Figure 5B:
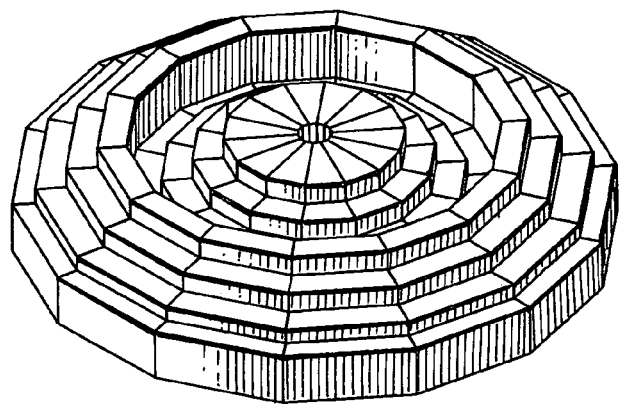
FIG. 5B shows a perspective view of the positive diffractive optical lens.

FIGS. 4A, 4B, 5A and 5B show examples of diffractive optics used to diffract light from a light source into an even illumination pattern. A negative lens is shown in FIGS. 4A and 4B and a positive lens is shown in FIGS. 5A and 5B. The use of a negative or positive lens will depend on which direction the light beam approaches the lens, i.e., entering at the surface with the diffraction pattern or the obverse side.

Figure 6A:
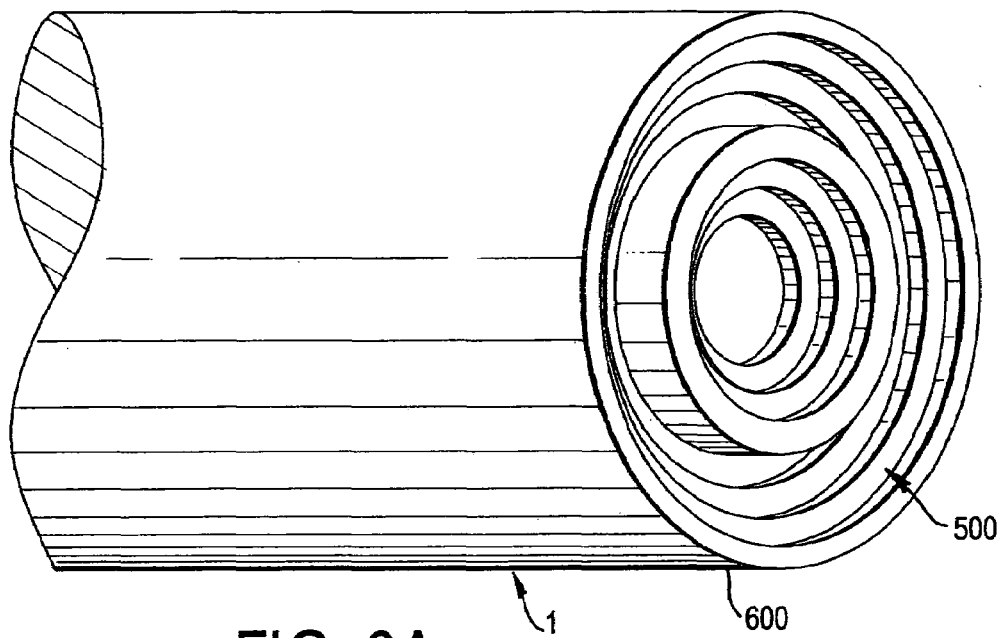
FIG. 6A shows a fiber optic according to a first embodiment of the invention.
Figure 6B:
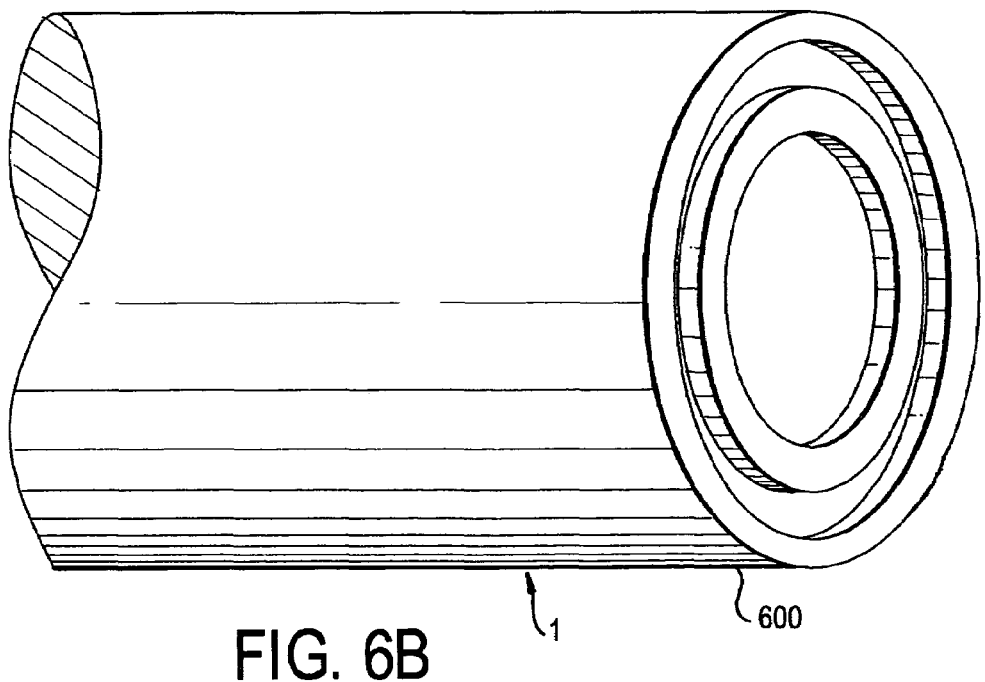
FIG. 6B shows a fiber optic according to an alternative embodiment of the invention.

The preferred embodiment of the invention is shown in FIG. 6A. A fiber optic 1 has a negative diffractive pattern incorporated into an output end 600 of the fiber optic 1. Shown here is a four-level phase modulating optical pattern 500 incorporated into the fiber optic 1. While a four-level element is used, it can be a two-level binary element, a four-level, an eight-level, etc. depending on the size and requirements of the system. An example of a two-level binary element is shown in FIG. 6B.

The diffractive pattern can be cut or etched into the fiber optic in a variety of methods known to those having ordinary skill in the art. For example, the diffractive pattern can be effected using a set of lithographic masks. Conventional optical raytrace computer programs produce a wavefront phase map, to create masks known in the art. The generation of the four-level element of the preferred embodiment can be created by exposure through a first and second mask. A binary two-level element would require a single mask, a four-level would require two masks, an eight-level would require three masks, etc. This process is shown in detail in U.S. Pat. No. 4,846,552, incorporated by reference in its entirety, which discloses a method of fabricating binary planar optical elements.

While etching is disclosed herein as a method to form the diffractive pattern, other methods may be used, such as cutting the shape into the fiber optic, molding the fiber optic into the shape, and any other method which is capable of forming a desired diffractive optical pattern on the end surface of a fiber optic.

Figure 7:
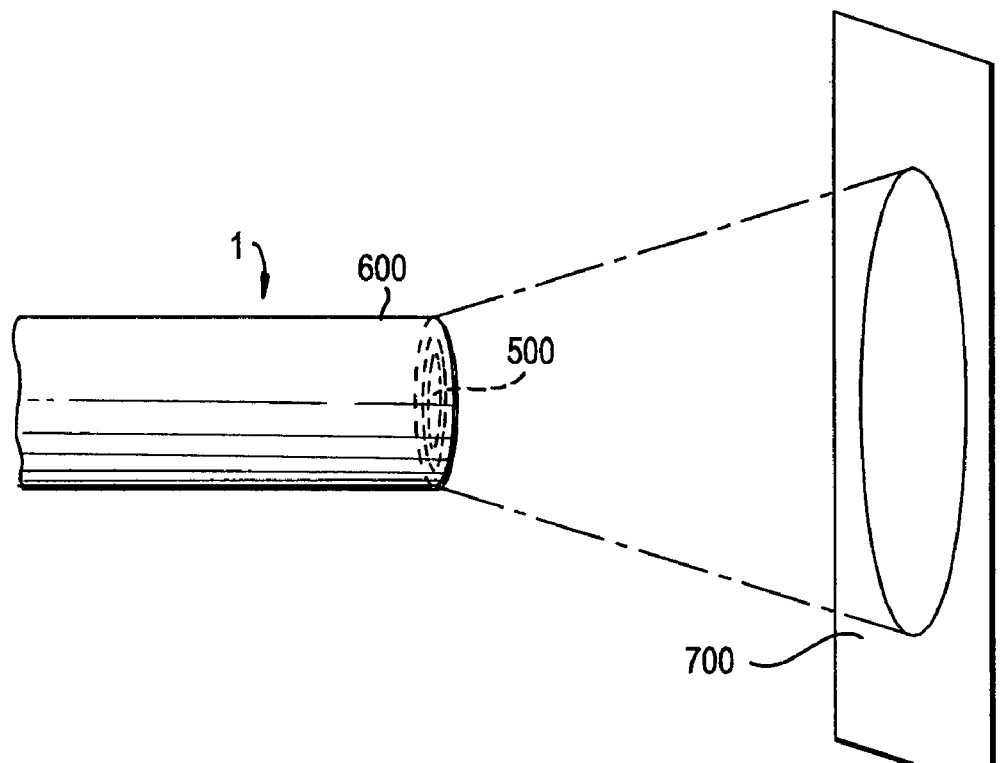
FIG. 7 illustrates a projection of a beam of light from a fiber optic according to the preferred embodiment of the invention.
Figure 8:
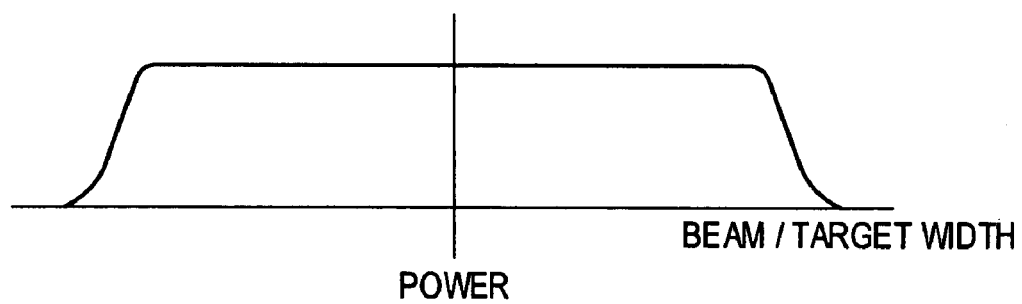
FIG. 8 illustrates a profile of the power dispersion on the target surface shown in FIG. 7.

As the light beams travel through the fiber optic 1, they interact with the optical pattern 500 to redirect the light beam upon its exit from the fiber optic. FIG. 7 shows the fiber optic 1 with the optical pattern 500 thereon emitting a light beam therefrom. The light beam is projected onto target 700. FIG. 8 represents the light distribution along line surface of the target. The width distance represents the width of the target 700 and the power intensity of the light beam is represented by the vertical axis. Note that with a negative lens on the output end 600 of the fiber optic 1, the power intensity is even across the target surface, generating an even illumination.

In another embodiment of this invention, the diffractive pattern on the ends of the fiber optic can be chosen to direct the light beam into one of a plurality of shapes. Diffractive lenses for projecting a desired shape from a laser diode are known in the art, for example, in U.S. Pat. No. 5,718,496, incorporated by reference herein in its entirety, which discloses the use of diffractive lenses in a laser pointer to create desired projection shapes from a laser diode, such as an arrow, a logo, a square or any other desired shape.

In a preferred application of the fiber optic according to this invention, the fiber optic is incorporated into a Video Guidance Sensor (VGS). A detailed description of such an apparatus is disclosed in *THE VIDEO GUIDANCE SENSOR—A FLIGHT PROVEN TECHNOLOGY*, by Richard T. Howard, Thomas Bryan, Michael L. Book and Richard W. Dabney, appearing in Volume 101, *Advances in the Astronautical Sciences, Guidance and Control* (1999), which is incorporated by reference herein in its entirety.

Figure 9:
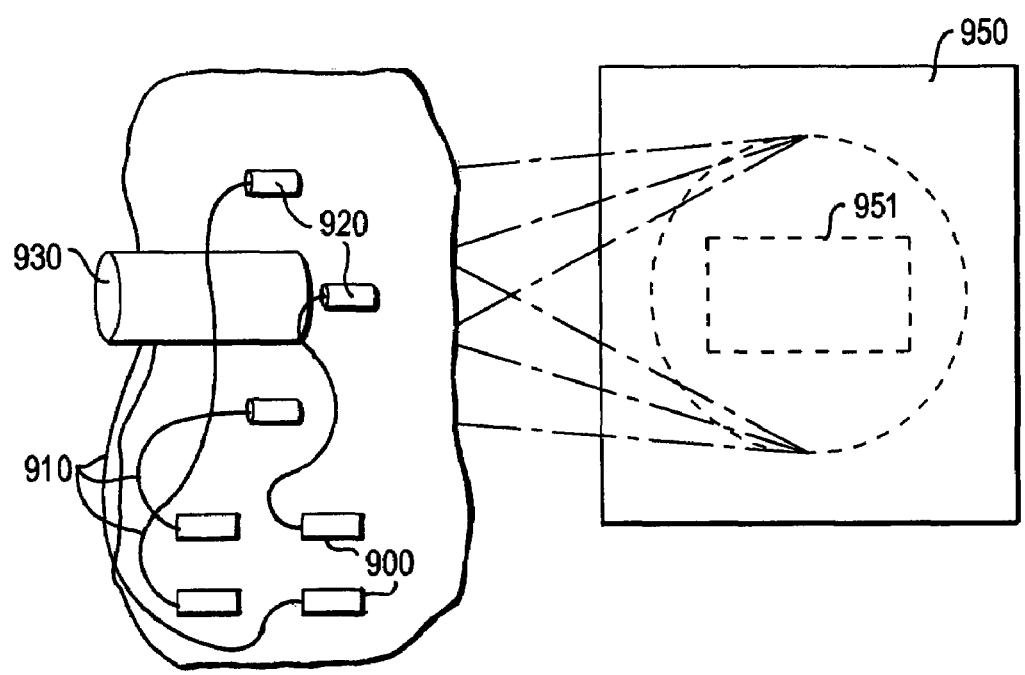
FIG. 9 shows a VGS system and a target.

The portion of the VGS of import to this application is the illumination portion, an example of which is shown in FIG. 9. Four laser-emitting diodes 900 on the VGS are coupled to fiber optics cables 910 that are mounted around a video camera 930 via a four mounts 920. The projection ends of the fiber optics 910 project light generated by the laser diodes 900 onto a target 950 and the reflection is recorded by the video camera 930. Each fiber optic 910 directs the light beam across the entire desired target to illuminate a field of view (FOV) 951 for the camera. The FOV 951 for the camera is generally rectangular, and an image picked up by the camera can be processed by the VGS. The VGS computes the relative positions and attitudes between the target in the FOV and the VGS for the purpose of guiding an automated vehicle to dock with another craft, or to provide relative position and attitude information to a pilot.

Figure 10:
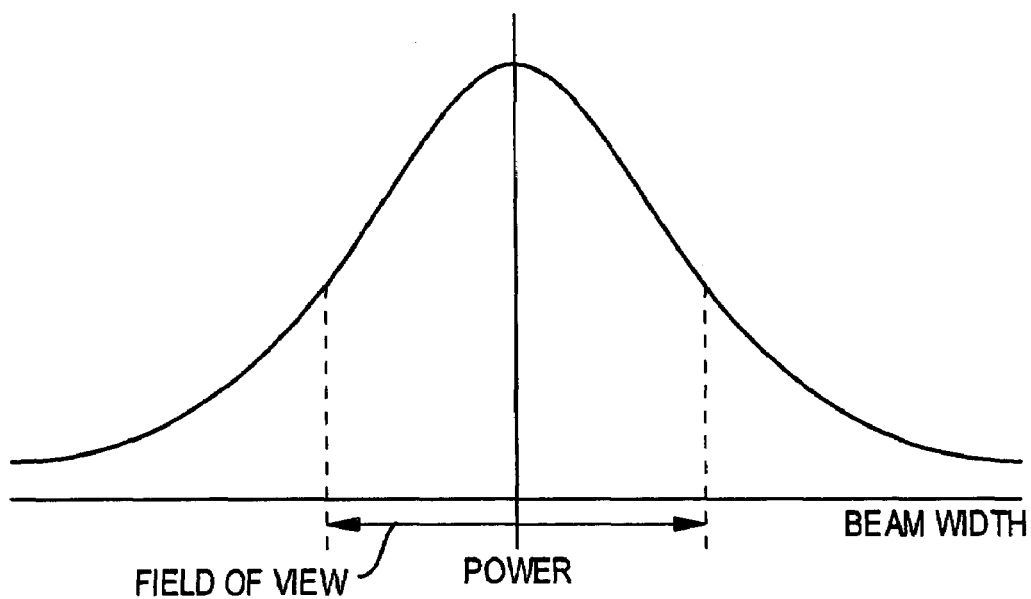
FIG. 10 illustrates a profile of the power dispersion on the target using the VGS shown in FIG. 9.

A problem using conventional fiber optics in the VGS is that due to the Gaussain profile of the light beam, much energy is wasted illuminating more than the cameras field of view. As shown by the graph in FIG. 10, the center region of the field of view of the camera is illuminated brightly, the brightest at the center, while the periphery is substantially dimmer, thus the camera is focused on the center while light outside the field of view is unused by the camera.

Figure 11:
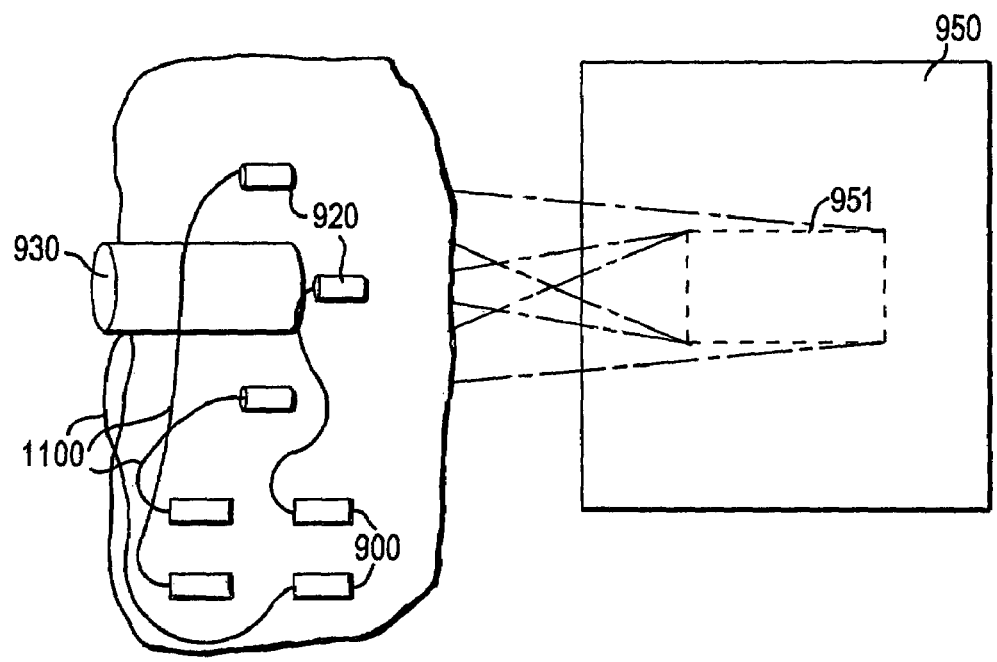
FIG. 11 shows the projection of the light beam in a VGS system using fiber optics according to the preferred embodiment of the invention.

Placement of a diffractive optic pattern on the end of each fiber optic cable in the VGS according to this invention reduces this waste of energy. As shown in FIG. 11, when using a system whereby each fiber optic cable 1100 has a diffractive pattern thereon, analogous to the fiber optic shown in FIG. 6, the system avoids the Gaussian profile light beam. Such would provide an even illumination across the surface of the target 950.

Figure 12:
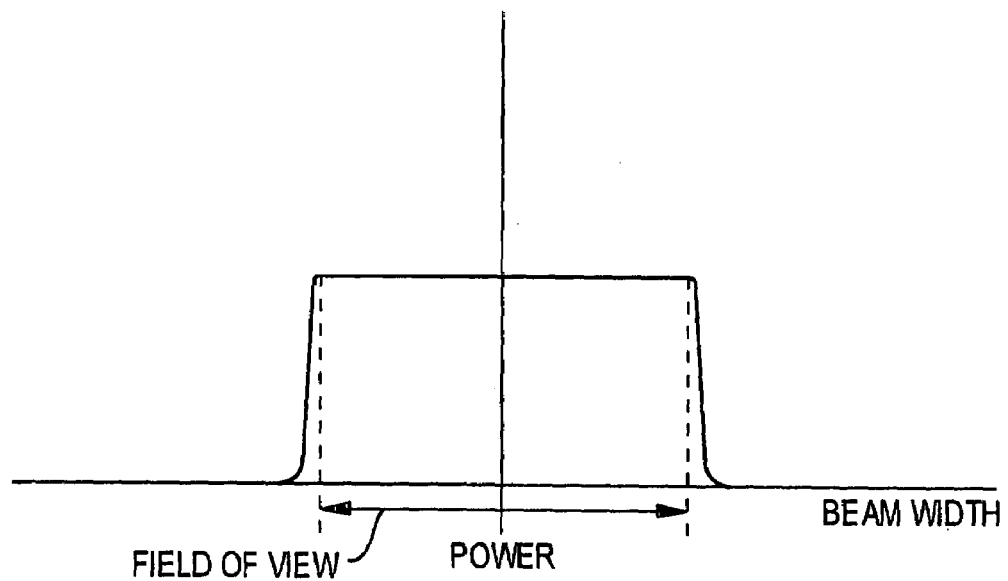
FIG. 12 illustrates a profile of the power dispersion on the target using the VGS system shown in FIG. 11.

Additionally, the diffractive pattern can be designed as outlined in U.S. Pat. No. 5,718,496 to produce a rectangular beam of light corresponding to the shape of the field of view. Such avoids projecting light outside the field of view of the camera, reducing the waste of light. The power distribution of the VGS using a diffractive optical pattern to provide an even illumination pattern and such that the beam of light is rectangularly shaped is shown in FIG. 12. Note that the waste of light outside the camera field of view is substantially reduced and the light across the field of view is evenly distributed.

Figure 13:
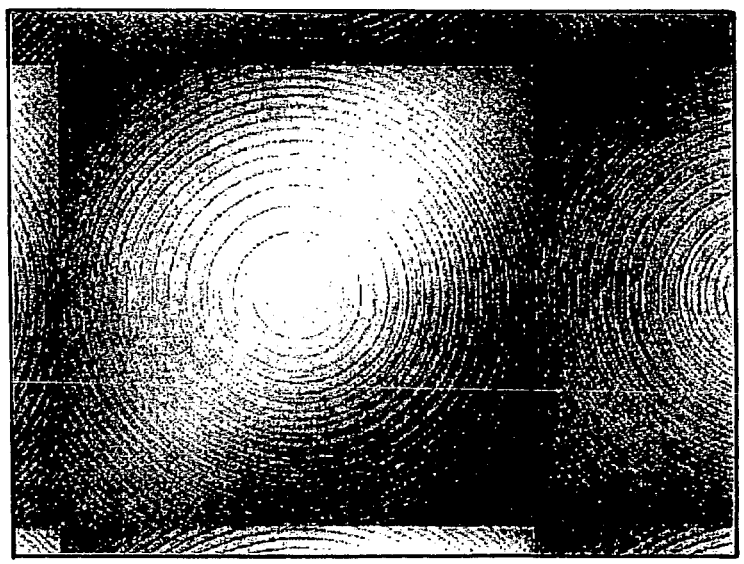
FIG. 13 shows a portion of a fiber optic according to a further embodiment of the invention having a plurality of diffractive patterns thereon.

In a further embodiment of the invention, a plurality of diffractive optical patterns can be placed onto the end of the fiber optic in a grid fashion similar to that shown in FIG. 13. Each diffractive optical pattern can create an even illumination pattern across its respective surface area. Each fiber optic as a whole then provides several overlapping illumination patterns from each grid pattern.

Although the present invention has been described and illustrated in detail to a specific diffractive design and fiber optic structure, such explanation is to be clearly understood that the same is by way of illustration and example only, and is not to be taken by way of limitation. Other modifications of the above example may be made by those having ordinary skill in the art which remain within the scope of the invention. Thus, the spirit and scope of the present invention should be defined only by the terms of the claims.

I claim:

1. A system for recording images using a camera, comprising:
    a plurality of laser emitting diodes; and
    a plurality of fiber optics coupled to respective laser emitting diodes at an input end thereof having an exit end with a binary or multi-level diffractive optical pattern formed thereon,
    wherein the diffractive optical pattern is formed by one of the group selected from etching, molding and cutting,
    wherein the exit ends of the fiber optics are arranged in a circular fashion around the camera,
    wherein laser light emitted from each laser emitting diode travels through a respective fiber optic and is projected onto a target after passing through the diffractive optical pattern to illuminate a portion of the target for recording images of the target, and said laser light provides an even rectangular illumination pattern across the target.

2. The system as described in claim 1, wherein there are a plurality of optical diffractive patterns on the exit end of each fiber optic.

* * * * *